April 26, 1966
J. R. REEDER ETAL
3,247,664
PROCESS FOR MAKING SUTURES
Original Filed May 21, 1963
4 Sheets-Sheet 1
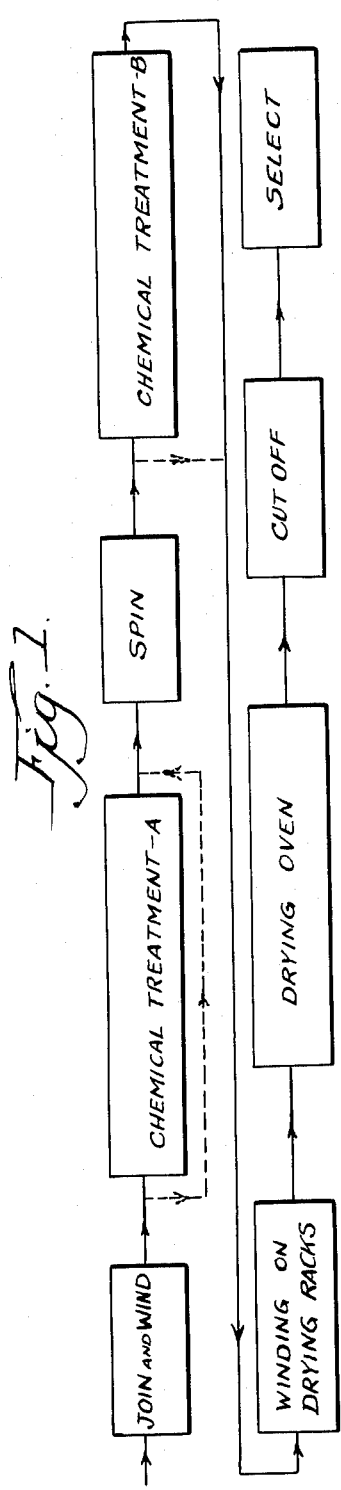
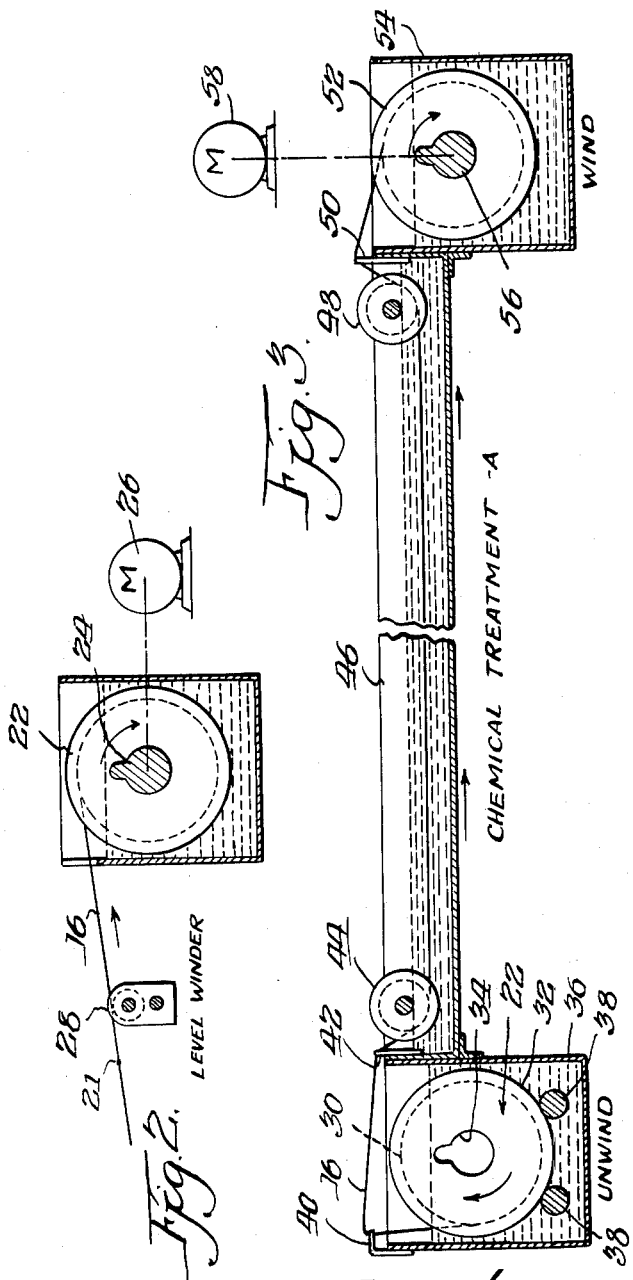
Inventors.
Jerry R. Reeder,
Raymond W. Bergman,
John Carl Norks
By J. L. Chisholm Atty.

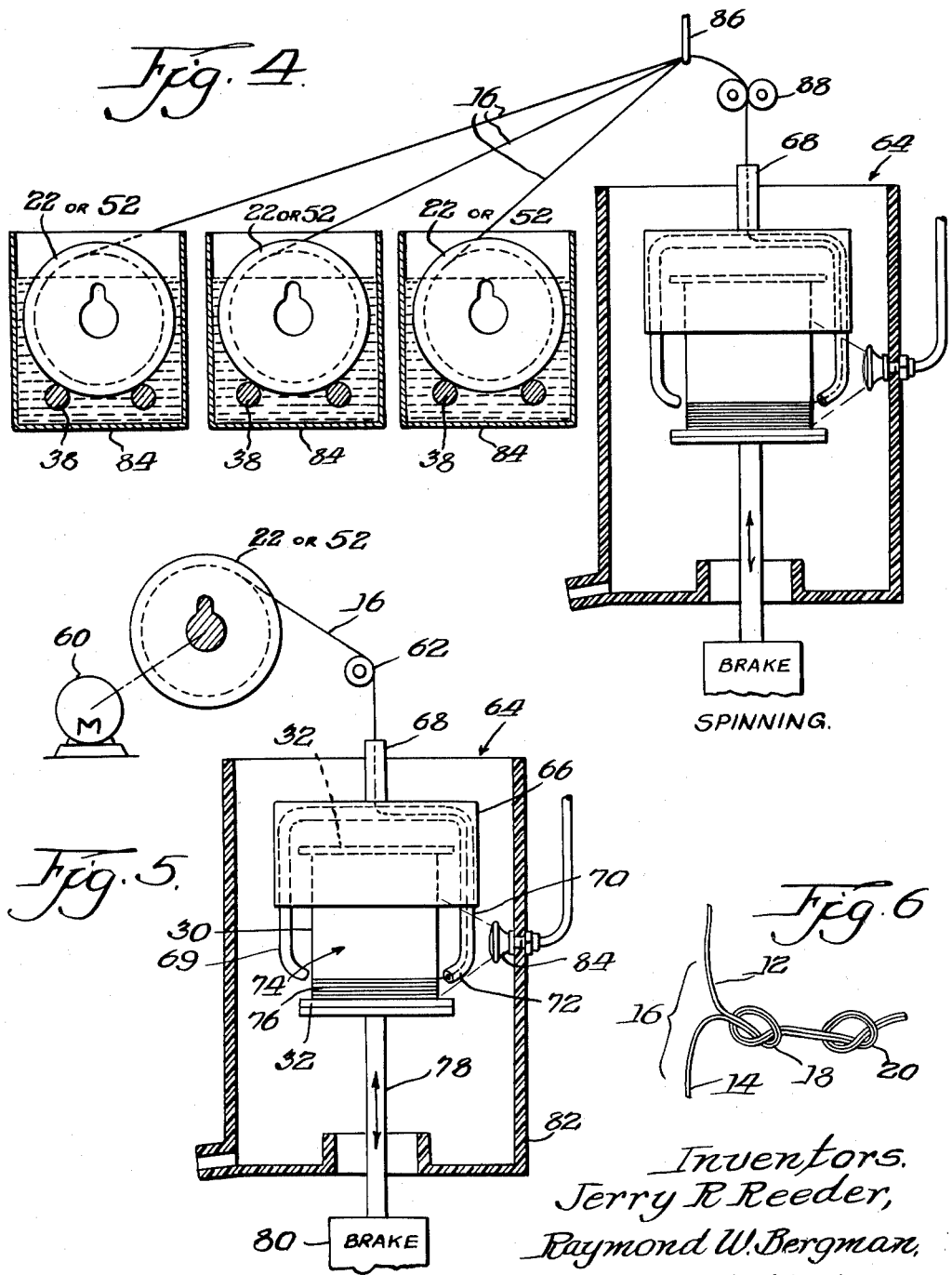

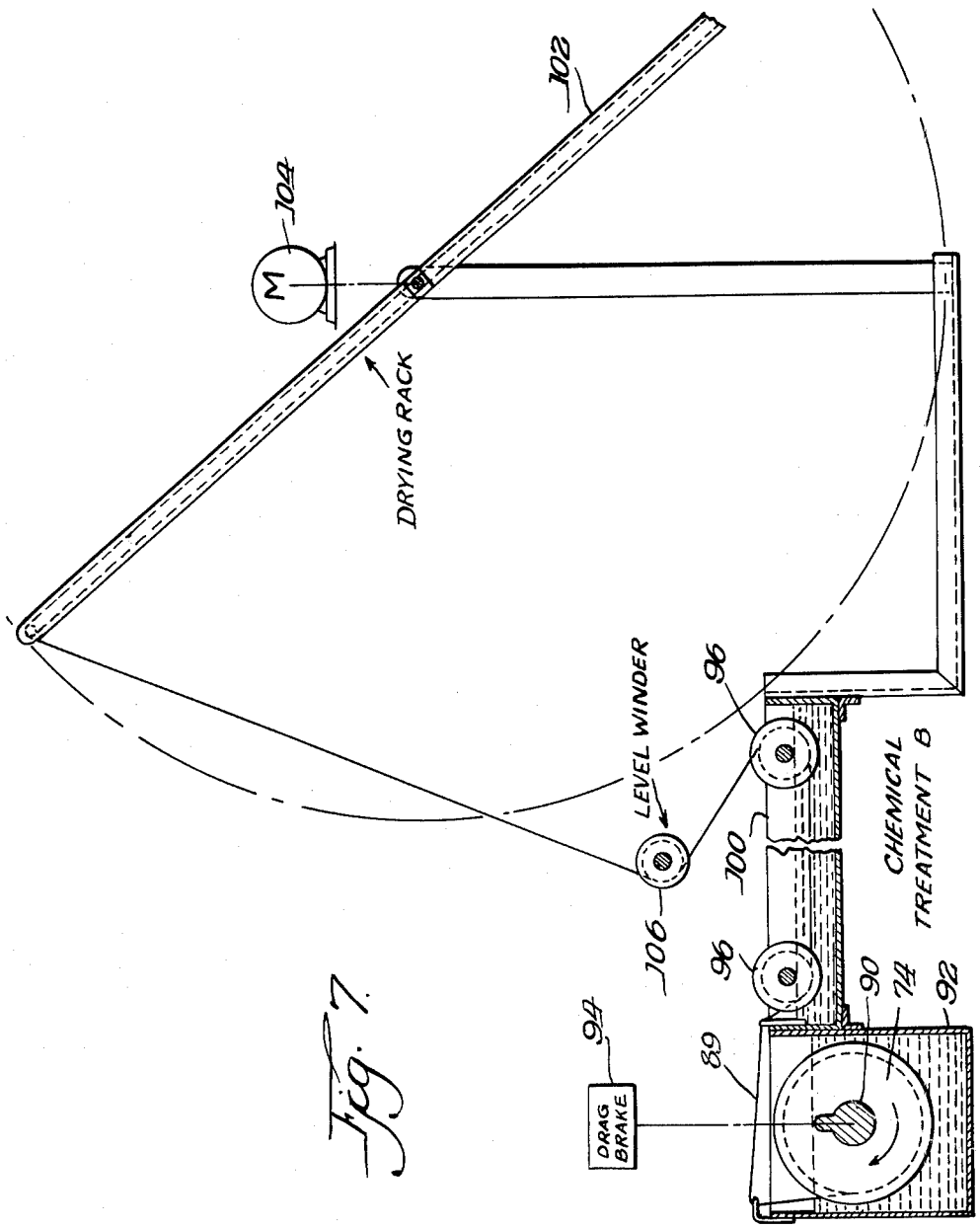

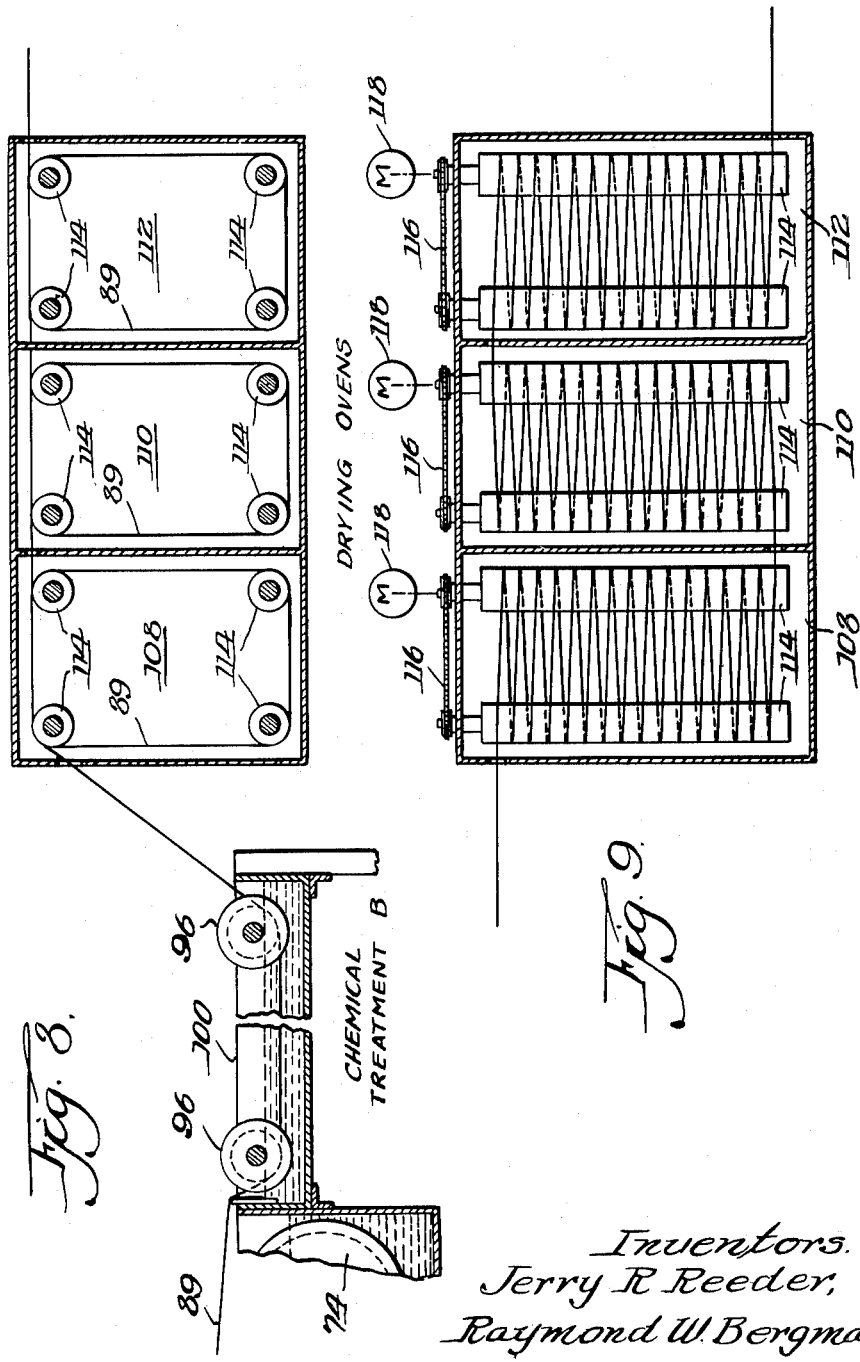

# United States Patent Office 3,247,664
Patented Apr. 26, 1966

3,247,664
PROCESS FOR MAKING SUTURES
Jerry R. Reeder, Lockport, Raymond W. Bergman, Joliet, and John Carl Norks, Aurora, Ill.; said Reeder and said Bergman assignors to Ethicon Inc., a corporation of New Jersey
Original application May 21, 1963, Ser. No. 282,083. Divided and this application Oct. 23, 1964, Ser. No. 410,342
(Filed under Rule 47(a) and 35 U.S.C. 116)
4 Claims. (Cl. 57—164)

This application is a division of the application of Reeder, Bergman, Gettemans and Norks, Serial No. 282,083 filed May 21, 1963, now abandoned.

This invention relates to the making of strings, especially surgical sutures, from animal gut and particularly to continuous processes for forming the gut into unlimited continuous lengths, and preparing and treating such continuous lengths.

Heretofore in the manufacture of sutures from animal gut it has been the practice to process the gut in relatively short lengths, for example thirty feet, or similar lengths suitable for handling. This has many well known disadvantages which result not only from the short lengths of starting material available but from the variation of physical and chemical characteristics from one specimen of gut to another.

It has long been desired to make continuous strings of animal intestines which are suitable for surgical sutures. Methods of doing this and apparatus for doing it have been proposed, for example those disclosed in the U.S. patents to Selby 2,391,483, 2,438,131 and 2,441,601. However none of the proposed methods or apparatus which have come to our attention can satisfactorily produce a continuous string of animal gut which can be formed into acceptable surgical sutures. This is particularly true where a very small diameter, single ply suture is to be made of a single ribbon or layer of animal gut which suture must be ground round accurately and polished to within very small tolerances, for example a few ten thousandths of an inch. In one of the proposed attempts to make continuous strings of animal gut, it has been proposed to overlap the ends of individual short lengths in a group of parallel short lengths, and press the ends together temporarily until the parallel lengths could be twisted into a multiple-ribbon strand. In such strand the twisting holds the overlapped ends together much as twisted yarn holds together the individual staple fibers of which it is made, until the gut is bonded together in a permanently twisted, multiple-ribbon strand. This is subject to many objections including the lumps formed by the overlaps, and necessity of carefully overlapping successive strips of gut by hand and keeping them overlapped until the separate and overlapped ribbons can be formed into the final structure. This difficulty has made it impossible to form sutures of a single layer of gut, because there has been no practical way in which these separate lengths of a single layer could be held together throughout the process of making them into a suture, and even if there were the suture would be unacceptable because it would have undetectable weak spots.

Our invention is based in part upon our surprising discovery that small, delicate, wet, slippery strips of animal gut can readily, cheaply and securely be tied together end to end by knots and that the knotted structure can be satisfactorily run through guides, feed rolls, spinning apparatus and the like without intereference from the knots. No satisfactory method nor apparatus has been devised before our inveniton, as far as we are aware, for joining such strips end to end into a continuous length of gut having only a single ply. Some aspects of our invention can be achieved by joining the strips end to end by any positive fastening such as metal fasteners or any suitable adhesives which will bond wet gut.

Another difficulty in the proposed system of making sutures from continuous lengths of animal gut is due to the difference in time treatment and necessary speed of passing the gut through various processes or steps in converting it from raw animal gut to a finished acceptable surgical suture. Ideally a continuous process of making sutures from gut would form short lengths of gut into a continuous strip, feed this strip into one end of a machine which would perform a series of steps or processes on the gut and deliver a continuous length of finished strand which would be acceptable for cutting up into surgical sutures. Although this objective has long been known we know of no one who has accomplished it.

It is among the objects of our invention to overcome the disadvantages of previously known processes and apparatus for forming sutures of animal gut by positively securing together end to end short lengths of gut and forming a continuous strand which might be, for example, a mile in length. This strand is fed successively through a series of continuous processes to form a continuous strand of material which can be cut up into suitable lengths which are acceptable for surgical sutures.

Specifically it is an object of the invention to provide groups of continuous processes with provision for an interruption between the two groups for the storage of the material where one group of processes must necessarily be operated at a different speed from another group of processes.

One of the difficulties of known apparatus for operating on thin, delicate strips has been the difficulty of handling the gut without breaking the strip, for example in winding and unwinding the gut from one step of the process to the next. Our invention includes an improved support or spool and another method of supporting the spool which offers negligible resistance to unwinding of the strands from the spools where this is essential in the process of treating the strand.

Another object of the invention is to provide an improved process and apparatus for spinning a single strand or a group of strands of gut into a twisted strand suitable for a suture and particularly to control the water content of the gut during the spinning operation.

It is also an object of the invention to combine a desired chemical treatment of the gut with this spinning operation, that is the gut is spun and chemically treated at the same time and by the same spinning device.

Other objects and advantages of our invention will be apparent from the following description and from the accompanying drawings in which:

FIG. 1 is a flow diagram of one series of steps or processes by which the invention may be performed.

FIG. 2 is a diagrammatic vertical section of one form of apparatus used in connection with the joining and winding step of the process shown in FIG. 1.

FIG. 3 is a diagrammatic longitudinal, vertical section of one form of apparatus for performing the first chemical treatment indicated in FIG. 1.

FIG. 4 is a diagrammatic vertical section of one form of apparatus for performing the spinning step in FIG. 1, particularly suitable for spinning a plurality of layers into a single string.

FIG. 5 is a diagrammatic vertical section of an alternative form of spinning device which is particularly suitable for twisting or spinning a single flat ribbon of gut into a round string.

FIG. 6 shows one arrangement of knots which has been found particularly advantageous for joining the ribbons end to end.

FIG. 7 is a diagrammatic longitudinal, vertical section of one form of apparatus for performing the steps of the second chemical treatment and winding on drying racks shown in FIG. 1.

FIG. 8 is a diagrammatic vertical, longitudinal section of an alternative continuous form of drying apparatus and FIG. 9 is a diagrammatic horizontal, longitudinal section of the drying apparatus shown in FIG. 8.

Before describing the invention in detail it is to be understood that the description and terminology used therein are for the purpose of illustration only and do not constitute any limitation of the invention.

As starting material we may use any known or suitable ribbon or strip of animal gut for example the sub-mucosa layer of the small intestine of sheep.

Referring to FIG. 6, two strips of gut 12 and 14 are positively joined end to end to form a continuous strip 16. We prefer to join the strip by knotting, for example with a pair of loop knots or binder knots composed of two single loop knots 18 and 20. The loop knot is preferred because it can be easily tied with wet, slippery gut and a pair of loop knots holds the pieces securely. Other knots can be used such as a square knot, but, as far as our investigation has gone, we have found it necessary that two knots be used. Regardless of the type of knot which is used we have found that tension on the strip 16 when the gut is wet causes a single knot 18 to slip along toward and off the free ends of the ribbon. The second knot 20 stops this slipping and a very slight amount of tension on the strip 16 combines the two knots into a small tight lump 21 (FIG. 2) in which the individual knots are not distinguishable. A square knot slips in similar manner unless it is given an extra tie or knot over the square. Surprisingly the lump formed by the knot is so small and compact that it does not interfere with the passing of the strip through guides, between feed rollers or through the flyer of a spinning machine.

One example of a process or series of processes to which our invention is applicable is illustrated by the flow diagram in FIG. 1. After the strips have been joined as shown in FIG. 6, the continuous strip may be drawn through a first chemical treating bath which may perform any of a variety of known chemical treatments for producing gut having desired physical and chemical characteristics. One example is to chromicize or tan the gut to provide the necessary or desired delay in absorption by human tissues. Thereafter the gut, whether a single strip, or a number of parallel strips, is spun into string after which the spun or twisted string may be given a second chemical treatment for example in a known formaldehyde bath. After this the string is dried for example by winding it on drying racks, and placing the racks in drying ovens or by passing the string continuously through a series of drying ovens. Thereafter the strand is cut to lengths suitable for use as individual sutures and the segments of the string containing the knots may be discarded, or cut into shorter lengths free of knots.

Our invention is applicable to any of the known chemical processes for treating and preparing animal gut to make sutures. While a first chemical treatment such as chromicizing and a second chemical treatment such as tanning by formaldehyde have been given as examples it is possible to carry out our invention by using only one chemical either before or after spinning, as indicated by the broken lines around the chemical steps in the flow diagram of FIG. 1.

Referring to FIG. 2, a single gut ribbon 16 is wound on a spool 22 splined on a shaft 24 driven by any suitable motor 26 which may be for example, a constant speed motor or a constant torque motor. The spool is partially immersed in water in order to preserve the desired water content of the gut. The strand 16 is preferably wound on the drum 22 by any suitable level winder 28. The spool is removed from the water after the desired length of gut is wound on it, and may be either transferred immediately to the next step in the process, or may be stored in an atmosphere of the necessary temperature and humidity, for a substantial period of time, for example 12 to 24 hours.

The next step may be the first chemical treatment illustrated in FIG. 3. The spool is of novel construction and has novel floating characteristics making it especially suitable for this process. As shown in FIGS. 3 and 5 for example, the spool has a hollow cylinder 30 on which the gut is wound, and a pair of end flanges 32 attached to it by a water tight fastening, as by being integrally molded or secured by adhesive. The end flanges project radially beyond the coil of gut to be laid on the spool. Each end flange has a coaxial opening 34 to receive a shaft, as 24 in FIG. 2. At least one of the openings is non-circular, for example like a key hole, to receive a spline on the shaft or otherwise form a driving connection with the shaft. Preferably each flange has the same kind of hole. Whenever the spool is placed in a liquid bath, as in a container 36, the spool sinks until air trapped in the spool floats it. Liquid flows into the spool as long as air can escape from it through one of the openings. When the liquid level inside the spool reaches the upper edge of the opening, the air vent is closed and no more water can flow in.

When this occurs the spool substantially floats in the bath. Ideally the weight of the spool and the gut on it is substantially equal to the weight of the liquid displaced so that the spool can be rotated without any friction contact with the sides or bottom of the container. However, if the spool is very slightly heavier than the liquid displaced, the flanges will rest very lightly against the bottom of the bath, or against rods 38 placed in the bath. These will hold the spool so that when it rotates under the unwinding action of the gut, as will be explained, the rods hold the spool in proper position and constrain its rotation to be substantially about its axis. Such resting on the bottom, or on the rods should be as light as possible so that the apparent weight of the spool on them is from zero to some very small positive value, just enough to keep the spool from wobbling. This is what we mean by substantially floating. This is achieved by proper selection of the density and amount of material in the spool, the location of the maximum radial distance of the edge of the hole 34 and the density of the liquid. The spool is intended to be rotated constantly, as will be explained, and the end of the spline slot in the opening 34, when up, determines the amount of liquid that can enter the spool.

Ordinarily the weight of the spool is such that the weight of the gut, even in long lengths of hundreds or thousands of feet, can be neglected.

Referring to FIG. 3, a spool 22, made and proportioned as just described, and wound with a strip of single layer gut ribbon 5000 feet long, for example, is placed in a tank 36 in which water is kept at a constant level by any known means. The ribbon 16 may be passed over one or more guides 40, 42, under an entrance roller 44 into liquid in a tank 46, under an exit roller 48, over a guide 50 and onto a take-up spool 52, which may be made like spool 22, and is immersed in liquid in a tank 54 and splined to a shaft 56 driven by a constant speed motor or a constant torque motor such as 58. This unwinds the ribbon 16 from the spool 22 against the negligible resistance of the floating spool rotating in the liquid, and draws the ribbon through the bath at the desired speed to provide the desired exposure to the chemical treatment in tank 46. The resistance to rotation offered by the spool determines the tension of the ribbon being unwound.

The liquid in tank 36 may be water or any desired chemical, to preserve the moisture content of the gut, to provide any desired chemical treatment, and to float the spool. The liquid in the tank 46 may provide any known chemical treatment such as chromicizing or tanning. It is important that the tension required to unwind the ribbon from the spool 22 be very low, for at this point the tensile strength of the ribbon is very low.

After being wound on the spool 52 (or on the spool 22 if chemical treatment A is omitted), a string is spun from one or more ribbons 16, for example by the alternative processes shown in FIGS. 4 and 5.

Referring to FIG. 5, a spool 22 or 52, holding a single-layer of untreated or chemically treated gut, is driven by a constant speed motor 60, to unwind at zero tension a ribbon 16 which then passes over guide 62 to a spinning apparatus generally designated by 64. This may be of conventional form but we prefer to use a flyer including an inverted cup 66, rotated in suitable bearings, not shown, by any suitable motor, not shown, and carrying within it a flyer tube including a central entering tube 68 and symmetrically disposed flyer tubes 69 and 70. Each flyer tube terminates in a trailing portion 72 which delivers the twisted string tangentially to a spool or drum 74 on which it forms the package 76. Only one flyer tube 69 or 70 is used. Two are provided to facilitate threading and to achieve balance. The spool 74 is mounted on a shaft 78 which is freely rotatable in bearings not shown against the resistance of any suitable eddy current drag brake 80. The brake, shaft and spool are cyclically traversed vertically, as is known, by any suitable means. The speed of the motor 60 is synchronized with the speed of the flyer so that the linear speed of unwinding the ribbon from the spool 22 or 60 equals the linear speed of laying the string on the package.

A feature of our invention is the spraying of the package during spinning by a liquid which at least preserves or restores the moisture content of the gut and preferably treats the gut chemically at the same time. The twisting tends to express water from the gut and the centrifugal action of the flyer tends to throw off still more. To counteract these tendencies we enclose the spinning apparatus in a container 82 and continuously spray the package with suitable liquid from a spray head 84.

If chemical treatment is not desired the package may be sprayed with water, just to restore and preserve the moisture content of the gut. However our invention includes spraying with any desired chemical treating solution, which may take the place of chemical treatment B in FIG. 1. For example the package may be sprayed with a humectant such as glycerine. The strength of the solution is selected to produce the desired characteristics in the gut during the time the gut is exposed to the remainder of the process before drying.

Alternatively the gut may be spun as shown in FIG. 4. One or more ribbons 16, on spools 22 or 52 may be floated in one or more tanks 84 each of which is precisely like tank 36 in FIG. 3 and contains water for floating the spools and preserving the water content of the gut. One or more strands may be passed over a guide 86 and fed between positively driven feed rollers 88 to the spinning device 64 which operates like that shown in FIG. 5. The floating spools provide the minimum resistance to rotation and thus develop the minimum tension in the ribbons 16 between the spools and the feed rolls. The feed rolls being vertically above the flyer intake tube 68 deliver the ribbons at no tension except that inherently developed by the spinning operation.

Where a plurality of ribbons 16 are spun, as in FIG. 6, preferably the ribbons are laid flat in a vertical stack in the guide 86 and so are pressed together flat by the feed rolls before being spun.

After spinning, and especially if the package is sprayed with water only, the twisted string may be put through chemical treatment B, which may consist of further tanning or hardening, as by a formaldehyde solution. This is shown in FIG. 7.

The spool 74 holding the string 89 twisted by the spinning operation is splined to a shaft 90 which may be immersed in water in a tank 92 and connected to a drag brake, such as an eddy current brake 94. The string 89 is pulled over suitable guides and under the rollers 96 immersed in suitable treating liquid in a tank 100 by a flat rectangular drying frame 102 rotated by a motor 104. Preferably the string is led over a level winder 106 which winds the string in separated turns about the drying frame. The drag brake develops the desired tension in the tank 100 for the chemical treatment, and the speed of winding, length of tank and strength of the solution are related to provide the desired time of treatment. If the chemical treatment B is omitted, the string is wound directly on the frame from the spool 74. This may be done, for example when the package in the spinning operation is sprayed with the chemical treating solution.

When the frame is filled the string is severed, the frame is hung in any suitable drying room or oven until the string is dry. Then all the loops or turns of string are pushed over to one side of the frame and severed at both ends of the frame so that each loop or turn provides two strings, each the length of the frame, for example 60 inches. Those lengths containing no fastenings or knots are then selected for sutures. Also each length which contains a knot only near its end can be used for shorter sutures such as 40 inches. In some instances sutures as short as 30 inches may be used, in which case lengths having knots near the center may be selected for sutures. Thus the invention provides a continuous string which can be conveniently processed and cut up into individual sutures with an extremely small amount of waste.

Instead of drying the string on racks or frames as shown in FIG. 7 we may dry continuously indefinite lengths of string as shown in FIGS. 8 and 9. Twisted and finished, but wet, string 89 may be led either from the spool 74 or from the tank 100 continuously through a series of drying chambers 108, 110 and 112. In each chamber the string may pass over four rollers 114 in a continuous and progressive coil. The rolls in each chamber may be positively driven by a chain and sprocket drive 116 actuated by a motor 118. One or more of the rolls may be driven and the remainder of the rolls may form anti-friction supports for the string. The rolls may be skewed or inclined as known in the synthetic filament art to cause the string to progress along the rolls in a series of separated turns. The rolls may be supported at one end only, as known in the synthetic filament art, to facilitate initial threading of the string around the rolls.

The atmosphere in the separate drying chambers may be, of course, controlled as desired. For example the humidity of the chambers may decrease progressively from 108 to 110 to 112 while the temperature in all ovens may remain the same, or may increase progressively from 108 to 110 to 112. The length of the pass through each oven is related to the temperature and humidity to expose the string for the desired length of time to accomplish the necessary drying.

Variations of the invention may be made within the scope of the appended claims. For example the spools from which the ribbon is unwound at various steps in the process may be entirely and freely floating. We have described a spool in which the weight of the spool, gut, liquid and entrapped air is exactly equal to, or very slightly greater than, the weight of liquid displaced. If the weight of the spool is slightly greater than the weight of liquid displaced, the spool will rest on the bottom of the tank or on the rods 38. If the weight becomes exactly equal to the weight of liquid displaced, the spool will stop sinking before it engages the bottom, and will float freely. In such case the front and back walls of the tank can be placed to act as guides to prevent wobbling in unwinding and the same low friction characteristics will prevail. It is also possible to place the rods 38 above the spool and adjust the liquid level in the tank and the amount of air trapped in the spool so that the weight of liquid displaced by the spool is slightly greater than the weight of the spool. In this case the spool will be yieldingly held up against the rods, or float up against them. All of the variations described in this paragraph come within the meaning of substantially floating, as used in the following claims.

We claim:

1. In a method of making continuous strings of animal gut the improvement which includes positively joining together end-to-end a series of ribbons of wet animal gut to form a continuous ribbon, continuously and progressively twisting the ribbon into a string while wetting the gut with liquid, and passing the string continuously through a drying atmosphere.

2. In a method of making continuous strings of animal gut the improvement which includes positively joining together end-to-end a series of ribbons of wet animal gut to form a continuous ribbon, continuously and progressively twisting the ribbon into a string while wetting the gut with liquid, and passing the string continuously over a series of rollers in a drying atmosphere.

3. In a method of making continuous strings of animal gut the improvement which includes positively joining together end-to-end a series of ribbons of wet animal gut to form a continuous ribbon, continuously and progressively twisting the ribbon into a string while wetting the gut with liquid, and passing the string continuously over a series of positively driven rollers in a drying atmosphere.

4. In a method of making continuous strings of animal gut the improvement which includes positively joining together end-to-end a series of ribbons of wet animal gut to form a continuous ribbon, twisting the ribbon into a string while spraying the gut with liquid, and passing the string continuously through a series of drying atmospheres of progressively decreasing humidity and progressively increasing temperature.

References Cited by the Examiner

UNITED STATES PATENTS

| | | | |
|---|---|---|---|
| 1,006,854 | 10/1911 | Kuhn | 57—35 X |
| 2,391,483 | 12/1945 | Selby | 57—164 |
| 2,558,734 | 7/1951 | Creswell | 68—181 |
| 2,627,103 | 2/1953 | Jennings | 28—76 |

FOREIGN PATENTS 310,884    2/1930    Great Britain.

MERVIN STEIN, *Primary Examiner.*